United States Patent
Kim et al.

(10) Patent No.: US 10,624,090 B2
(45) Date of Patent: Apr. 14, 2020

(54) METHOD AND APPARATUS FOR COMMUNICATION THROUGH SUBFRAME OCCUPIED BY UNLICENSED FREQUENCY

(71) Applicant: LG ELECTRONICS INC., Seoul (KR)

(72) Inventors: Sangwon Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 63 days.

(21) Appl. No.: 15/556,162

(22) PCT Filed: Jan. 28, 2016

(86) PCT No.: PCT/KR2016/000948
§ 371 (c)(1),
(2) Date: Sep. 6, 2017

(87) PCT Pub. No.: WO2016/144002
PCT Pub. Date: Sep. 15, 2016

(65) Prior Publication Data
US 2018/0054822 A1 Feb. 22, 2018

Related U.S. Application Data

(60) Provisional application No. 62/130,592, filed on Mar. 9, 2015.

(51) Int. Cl.
*H04W 72/04* (2009.01)
*H04L 5/00* (2006.01)
(Continued)

(52) U.S. Cl.
CPC ......... *H04W 72/0453* (2013.01); *H04L 5/005* (2013.01); *H04L 5/0091* (2013.01);
(Continued)

(58) Field of Classification Search
CPC ....... H04L 27/2032; H04L 5/00; H04L 5/001; H04L 5/0091; H04W 16/14; H04W 48/12;
(Continued)

(56) References Cited

U.S. PATENT DOCUMENTS

2013/0336156 A1* 12/2013 Wei .................. H04L 5/001
370/252
2014/0003387 A1* 1/2014 Lee .................. H04L 5/001
370/330
(Continued)

FOREIGN PATENT DOCUMENTS

KR 10-2014-0010385 A 1/2014

OTHER PUBLICATIONS

Considerations of measurement issues in LAA 3GPP TSG-RAN R2-150249 Huawei HiSilicon Feb. 2015 (Year: 2015).*
(Continued)

*Primary Examiner* — Rina C Pancholi
(74) *Attorney, Agent, or Firm* — Birch, Stewart, Kolasch & Birch, LLP

(57) ABSTRACT

A method for performing, by a terminal, communication using an unlicensed frequency in a wireless communication system, and an apparatus supporting the same are provided. The terminal may receive, from a serving cell on a licensed frequency, a subframe indicator indicating a subframe which is occupied by an unlicensed frequency, and may determine, on the basis of the received subframe indicator, the subframe which is occupied by an unlicensed frequency. Another method for performing, by a terminal, communication using an unlicensed frequency in a wireless communication system is provided. A PDCCH of a serving cell is monitored using a new radio network temporary identifier (RNTI); a reference signal indication is received from the monitored
(Continued)

PDCCH of the serving cell; and a subframe which is occupied by an unlicensed frequency is determined on the basis of the received reference signal indication, wherein the new RNTI may be an RNTI which has been newly established in the terminal in order to receive the reference signal indication from the PDCCH.

10 Claims, 13 Drawing Sheets

(51) Int. Cl.
| | |
|---|---|
| H04L 27/00 | (2006.01) |
| H04L 27/20 | (2006.01) |
| H04W 16/14 | (2009.01) |
| H04W 48/12 | (2009.01) |
| H04W 56/00 | (2009.01) |
| H04W 72/08 | (2009.01) |

(52) U.S. Cl.
CPC ...... *H04L 27/0006* (2013.01); *H04L 27/2032* (2013.01); *H04W 16/14* (2013.01); *H04W 48/12* (2013.01); *H04W 56/0005* (2013.01); *H04W 56/0015* (2013.01); *H04W 72/085* (2013.01); *H04L 5/001* (2013.01)

(58) Field of Classification Search
CPC ......... H04W 56/0005; H04W 56/0015; H04W 72/0453; H04W 72/085; H04W 72/04; H04W 72/042
See application file for complete search history.

(56) References Cited

U.S. PATENT DOCUMENTS

| | | | |
|---|---|---|---|
| 2014/0029561 A1* | 1/2014 | Kim | H04W 72/042 370/329 |
| 2014/0378157 A1* | 12/2014 | Wei | H04W 16/14 455/454 |
| 2015/0049741 A1* | 2/2015 | Chen | H04W 48/12 370/336 |
| 2016/0007378 A1* | 1/2016 | Bertorelle | H04W 56/001 370/329 |
| 2016/0073366 A1* | 3/2016 | Ng | H04W 56/001 370/329 |
| 2017/0048828 A1* | 2/2017 | Um | H04L 1/0061 |

OTHER PUBLICATIONS

Huawei, HiSilicon "Considerations of Measurement Issues in LAA", R2-150249, 3GPP TSG-RAN WG2 Meeting #89, Athens, Greece, Feb. 9-12, 2015.

Lte Advanced, "3rd Generation Partnership Project; Technical Specification Group Radio Access Network; Evolved Universal Terrestrial Radio Access (E-TRA); Physical Channels and Modulation (Release 10)", Technical Specification, 3GPP TS 36.211 V10.1.0 (Mar. 2011).

* cited by examiner

METHOD AND APPARATUS FOR COMMUNICATION THROUGH SUBFRAME OCCUPIED BY UNLICENSED FREQUENCY

CROSS REFERENCE TO RELATED APPLICATIONS

This application is the National Phase of PCT/KR2016/000948 filed on Jan. 28, 2016, which claims priority under 35 U.S.C. § 119(e) to U.S. Provisional Application No. 62/130,592 filed on Mar. 9, 2015, all of which are hereby expressly incorporated by reference into the present application.

BACKGROUND OF THE INVENTION

Field of the Invention

The present invention relates to a wireless communication system, and more particularly, to a method for performing communication, by a UE, using a subframe occupied by an unlicensed frequency, and an apparatus supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

Recently, with an increase in data traffic usage, methods have been required that sufficiently satisfy the demand on data use from customers without involving large-scale investment in facilities or a huge increase in communication fees. Accordingly, in order to cope with a data explosion, a large number of wireless service carriers adopt one solution of offloading wireless data traffic concentrating on 3G or LTE networks by utilizing a WLAN communication system available in an unlicensed band, such as the ISM bands.

An unlicensed band is characterized in that since wireless service carriers do not need to obtain the exclusive right to use frequencies in this band through an auction process or the like, an elaborately-designed WLAN is capable of handling significant levels of capacity at remarkably low costs in this band, as compared with a network established in a licensed band. However, since large numbers of communication equipment may be used in an unlicensed band without restriction under rules associated with a certain level of adjacent band protection and in-band interference, a communication service using the unlicensed band may not guarantee as high communication quality as a communication service through a licensed band within the exclusive right can provide. In addition, although standardization for interworking HSPA or LTE services as 3GPP technologies with Wi-Fi as an IEEE technology has been in progress since 2002, it is difficult to completely integrate two networks with different network structures and to provide a service in view of handover and guaranteed QoS.

In order to solve these problems, LTE technology in an unlicensed band (LTE on unlicensed spectrum (LTE-U) or U-LTE) has been actively discussed recently.

SUMMARY OF THE INVENTION

A cell on an unlicensed frequency is allowed to transmit a reference signal only during a channel occupation time. However, since a UE cannot know the channel occupation time, the UE cannot know when the reference signal is transmitted. Therefore, the UE does not know when to attempt to perform channel state information (CSI) measurement on the unlicensed frequency. Accordingly, in order to solve these problems, the present invention proposes a method for performing communication using a subframe occupied by an unlicensed frequency, and an apparatus supporting the same.

According to one embodiment, there is provided a method for performing communication, by a UE, using an unlicensed frequency in a wireless communication system. The UE may receive a subframe indicator that indicates a subframe occupied by an unlicensed frequency from a serving cell on a licensed frequency and may determine a subframe occupied by the unlicensed frequency based on the received subframe indicator.

The UE may further receive a reference signal via the determined subframe occupied by the unlicensed frequency.

The UE may further perform cell measurement based on the received reference signal. The cell measurement may be one of radio resource management (RRM) measurement, radio link monitoring (RLM) measurement, and channel state information (CSI) measurement.

The UE may further receive a discovery reference signal (DRS) via a subframe overlapping with a DRS measurement timing configuration (DMTC) occasion among the determined subframes occupied by the unlicensed frequency.

According to another embodiment, there is provided a method for performing communication, by a UE, using an unlicensed frequency in a wireless communication system. The UE may monitor a PDCCH of a serving cell using a new radio network temporary identifier (RNTI), may receive a reference signal indication from the monitored PDCCH of the serving cell, and may determine a subframe occupied by the unlicensed frequency based on the received reference signal indication, wherein the new RNTI may be an RNTI newly set for the UE to receive the reference signal indication from the PDCCH.

The reference signal indication may include information indicating whether a reference signal for radio resource management (RRM), radio link monitoring (RLM), or channel state information (CSI) measurement in the unlicensed frequency is included.

The reference signal indication may include at least one of information on number of subframes occupied by the unlicensed frequency, information on a subframe occupied by the unlicensed frequency, and identifier information on a cell on the unlicensed frequency.

A plurality of reference signal indications may be signaled via a single PDCCH.

The UE may further receive a reference signal on the determined subframe occupied by the unlicensed frequency.

The UE may further perform cell measurement based on the received reference signal. The cell measurement may be one of radio resource management (RRM) measurement, radio link monitoring (RLM) measurement, and channel state information (CSI) measurement.

The PDCCH of the serving cell may be a PDCCH of a serving cell on a licensed frequency.

The PDCCH of the serving cell may be a PDCCH of a serving cell on the unlicensed frequency.

According to still another embodiment, there is provided a UE performing communication using an unlicensed frequency in a wireless communication system. The UE may include: a memory; a transceiver; and a processor to connect the memory and the transceiver, wherein the processor may be configured to: control the transceiver to receive a subframe indicator that indicates a subframe occupied by an unlicensed frequency from a serving cell on a licensed frequency; and determine a subframe occupied by the unlicensed frequency based on the subframe indicator.

A UE may recognize a subframe occupied by an unlicensed frequency.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
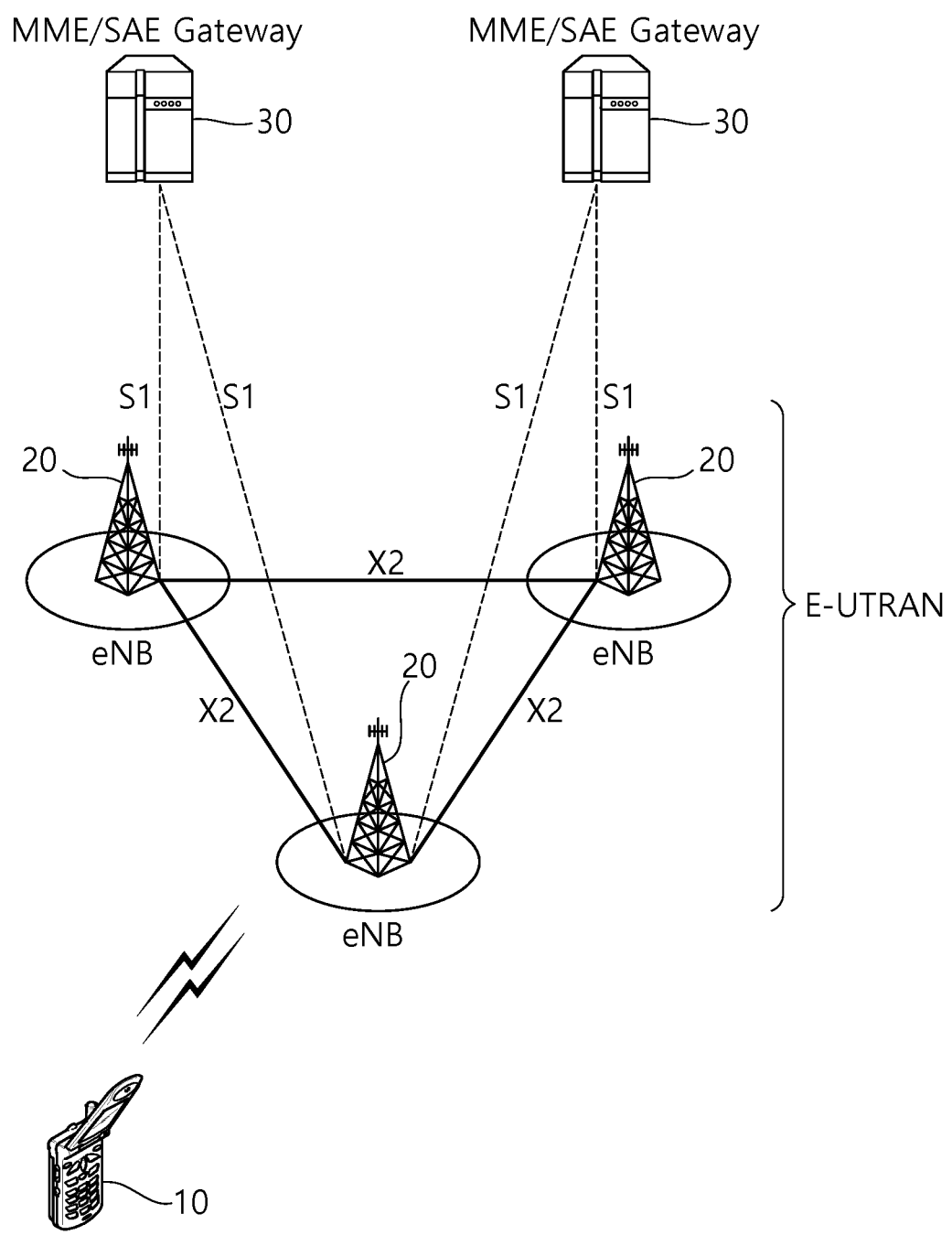
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
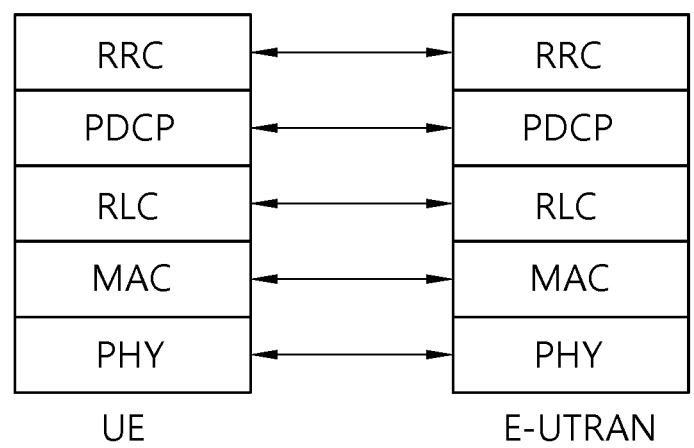
FIG. 2 shows a control plane of a radio interface protocol of an LTE system.
Figure 3:
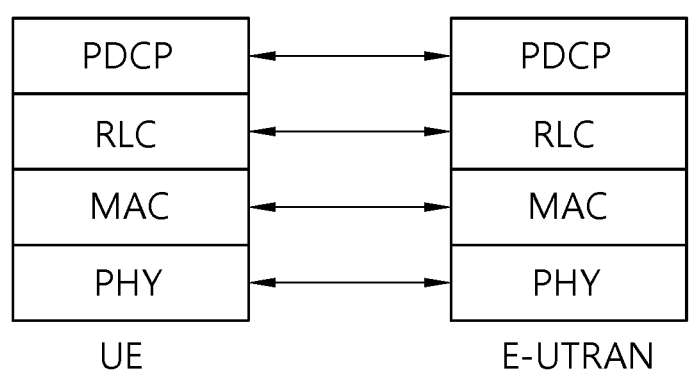
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
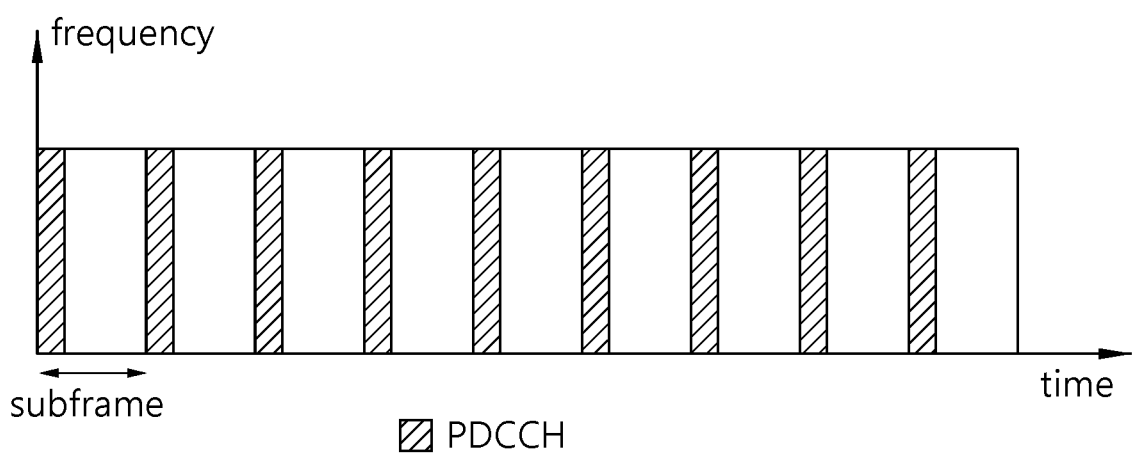
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

Hereinafter, a carrier aggregation (CA) system will be described.

Figure 5:
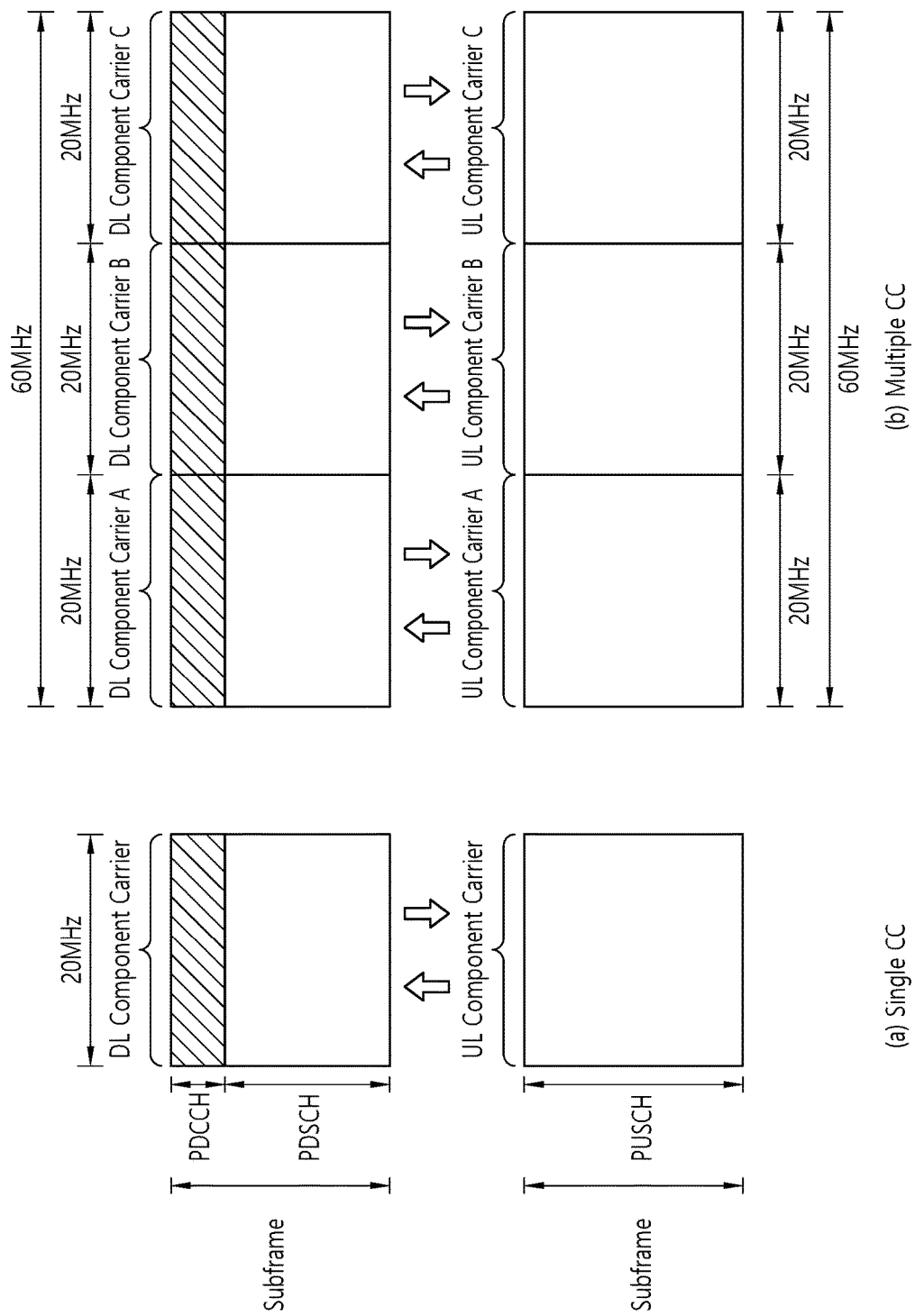
FIG. 5 shows a legacy single-carrier system and a carrier aggregation system.

FIG. 5 shows a legacy single-carrier system and a carrier aggregation system.

Referring to FIG. 5, only one carrier is supported for a UE in an uplink and a downlink in the single-carrier system. Although the carrier may have various bandwidths, only one carrier is assigned to the UE. Meanwhile, multiple component carriers (CCs) (i.e., DL CCs A to C and UL CCs A to C) can be assigned to the UE in the carrier aggregation (CA) system. A CC implies a carrier used in a carrier aggregation system, and can be simply referred to as a carrier. For example, three 20 MHz CCs can be assigned to allocate a 60 MHz bandwidth to the UE.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a carrier having a bandwidth of 1.4 MHz, 3 MHz, 5 MHz, 10 MHz, 15 MHz, and 20 MHz, and a 3GPP LTE-A system can configure a broadband of 20 MHz or higher by using each carrier of the 3GPP LTE system as a CC. Alternatively, the broadband can be configured by defining a new bandwidth without having to directly use the bandwidth of the legacy system.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if carrier aggregation (CA) is not considered, uplink and downlink frequency resources can always exist in pair in one cell. In order to transmit and receive packet data through a specific cell, the UE first has to complete a configuration of the specific cell. Herein, the configuration implies a state of completely receiving system information required for data transmission and reception for the cell. For example, the configuration may include an overall procedure that requires common physical layer parameters necessary for data transmission and reception, media access control (MAC) layer parameters, or parameters necessary for a specific operation in a radio resource control (RRC) layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The UE can monitor or receive a control channel (i.e., PDCCH) and a data channel (i.e., PDSCH) of an activated cell in order to confirm a resource (e.g., frequency, time, etc.) allocated to the UE.

The deactivation implies that transmission or reception of traffic data is impossible and measurement or transmission/reception of minimum information is possible. The UE can receive system information (SI) required for packet reception from a deactivated cell. On the other hand, the UE does not monitor or receive a control channel (i.e., PDCCH) and a data channel (i.e., PDSCH) of the deactivated cell in order to confirm a resource (e.g., frequency, time, etc.) allocated to the UE.

A cell can be classified into a primary cell, a secondary cell, a serving cell, etc.

The primary cell implies a cell which operates at a primary frequency, and also implies a cell which performs an initial connection establishment procedure or a connection re-establishment procedure or a cell indicated as the primary cell in a handover procedure. The secondary cell implies a cell which operates at a secondary frequency, and is configured when an RRC connection is once established and is used to provide an additional radio resource.

The serving cell is formed of a primary cell in the case of a UE in which a Carrier Aggregation (CA) has not been configured or to which a CA cannot be provided. If a CA has been configured for a UE, the term 'serving cell' is used to indicate a primary cell and one of all secondary cells or a set of a plurality of secondary cells. That is, a primary cell means one serving cell which provides security inputs and NAS mobility information in an RRC establishment or re-establishment state. At least one cell may be configured to form a set of serving cells along with a primary cell depending on the capabilities of UE. The at least one cell is called a secondary cell. Accordingly, a set of serving cells configured for one UE may be formed of only one primary cell or may be formed of one primary cell and at least one secondary cell.

A primary component carrier (PCC) denotes a CC corresponding to the primary cell. The PCC is a CC that establishes an initial connection (or RRC connection) with a BS among several CCs. The PCC serves for connection (or RRC connection) for signaling related to a plurality of CCs, and is a CC that manages a UE context which is connection information related to the UE. In addition, the PCC establishes a connection with the UE, and thus always exists in an activation state when in an RRC connected mode.

A secondary component carrier (SCC) denotes a CC corresponding to a secondary cell. That is, the SCC is a CC allocated to the UE in addition to the PCC. The SCC is an extended carrier used by the UE for additional resource allocation or the like in addition to the PCC, and can be in an activation state or a deactivation state.

A downlink CC corresponding to the primary cell is called a downlink primary component carrier (DL PCC), and an uplink CC corresponding to the primary cell is called an uplink primary component carrier (UL PCC). A DL CC corresponding to the secondary cell is called a DL secondary CC (SCC). A UL CC corresponding to the secondary cell is called a UL SCC.

The primary cell and the secondary cell have the following features.

First, the primary cell is used for PUCCH transmission. Second, the primary cell is always activated, whereas the secondary cell is activated/deactivated according to a specific condition. Third, when the primary cell experiences a radio link failure (RLF), RRC re-establishment is triggered. Fourth, the primary cell can be changed by a handover procedure accompanied by a random access channel (RACH) procedure or security key modification. Fifth, non-access stratum (NAS) information is received through the primary cell. Sixth, in case of an FDD system, the primary cell always consists of a pair of a DL PCC and a UL PCC. Seventh, for each UE, a different CC can be configured as the primary cell. Eighth, the primary cell can be replaced only through a handover, cell selection/cell reselection procedure. When adding a new secondary cell, RRC signaling can be used for transmission of system information of a dedicated secondary cell.

A DL CC can construct one serving cell. Further, the DL CC can be connected to a UL CC to construct one serving cell. However, the serving cell is not constructed only with one UL CC. Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a downlink and an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC (carrier #0)+20 MHz CC (carrier #1)+20 MHz CC (carrier #2)+20 MHz CC (carrier #3)+5 MHz CC (carrier #4).

Hereinafter, a reference signal (RS) is described.

In the wireless communication system, since data/signal is transmitted through a radio channel, the data/signal may be distorted on the radio during transmission. In order to normally receive the distorted signal, it is preferable that distortion of the received signal should be compensated using channel information. At this time, a reference signal (RS) known by both a transmitter and a receiver may be used by the transmitter and/or the receiver to detect channel information. The reference signal may be referred to as a pilot signal. When the transmitter transmits and receives data by using multiple antennas, it is preferable that a channel state between each transmitting antenna and each receiving antenna should be detected, whereby the receiver may receive the data exactly. At this time, it is preferable that each transmitting antenna of the transmitter has its individual reference signal to detect the channel state.

Downlink reference signals include a common reference signal (CRS) shared by all UEs in one cell, a UE-specific reference signal (UE-specific RS) only for a specific UE, a multimedia broadcast and multicast single frequency network (MBSFN) reference signal, a positioning reference signal (PRS), and a channel state information reference signal (CSI RS).

A transmitter may provide information for demodulation and channel measurement to a receiver using reference signals. The receiver (for example, a UE) may measure a channel state using a CRS and may feed an indicator relating to channel quality, such as a channel quality indicator (CQI), a precoding matrix index (PMI) and/or a rank indicator (RI), back to the transmitter (for example, a BS) according to the measured channel state. In the present specification, a CRS may be a cell-specific reference signal (cell-specific RS). The CRS is transmitted via all downlink subframes within a cell supporting PDSCH transmission. The CRS may be transmitted through antenna ports 0 to 3 and may be defined only for $\Delta f=15$ kHz. The CRS is disclosed in Section 6.10.1 of 3GPP TS 36.211 V10.1.0 (2011 March).

Meanwhile, a reference signal relating to the feedback of channel state information (CSI) may be defined as a CSI-RS. The CSI-RS may be relatively sparsely deployed in a frequency domain or time domain, and may be punctured in a data region of a normal subframe or an MBSFN subframe. If necessary, a CQI, a PMI, and an RI may be reported from a UE through CSI estimation.

A UE-specific RS may be transmitted to UEs through resource elements when the demodulation of data on a PDSCH is needed. A UE may receive the presence of a UE-specific RS through upper-layer signaling. The UE-specific RS is valid only when mapped to a corresponding PDSCH signal.

An MBSFN RS may be transmitted via a subframe allocated for MBSFN transmission. A PRS may be used for location estimation of a UE. A CSI RS is used for channel estimation for a PDSCH of a LTE-A UE.

Generally, an RS is transmitted as a sequence. Any sequence may be used as an RS sequence without particular restrictions. The RS sequence may be a phase shift keying (PSK)-based computer generated sequence. Examples of PSK include binary phase shift keying (BPSK), quadrature phase shift keying (QPSK), or the like. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, or the like. Alternatively, the RS sequence may be a pseudo-random (PN) sequence. Examples of the PN sequence include an m-sequence, a computer generated sequence, a Gold sequence, a Kasami sequence, or the like. In addition, the RS sequence may be a cyclically shifted sequence.

Hereinafter, a discovery reference signal (DRS) is described.

A microcell, a femtocell, and a picocell, which have small service coverage, may be installed at specified locations within the coverage of a macrocell with wide coverage. Such cells may be referred to as small cells. A small cell cluster is a set of geographically adjacent small cells. In most cases, one or two clusters are located in one macrocell (or sector) to provide high traffic for a UE.

To adjust inter-cell interference, the states of some small cells belonging to a small cell cluster may be changed (on/off) per appropriate time (dozens of milliseconds (ms)), thus performing inter-cell traffic load balancing. To reduce time to change the states of the small cells, even a turned-off small cell may transmit some signals (for example, a CRS or CSI RS) according a low period (for example, 40 ms) so that a UE may perform radio resource management (RRM) measurement regardless of the states of the small cells. That is, in order to increase downlink traffic, the on/off states of the small cells belonging to the small cell cluster may be changed. An off-state small cell, which has an increase in traffic load, quickly may need to change to an on state, while an on-state small cell, which has a low traffic load, may need to change to an off state. A method in which a small cell hands over the traffic loads of serving UEs to a neighboring small cell in the on state and changes to the off state may be considered. Since the small cell is in the off state, the neighboring small cell has a reduced level of interference, thus indirectly resulting in the effect of increasing downlink traffic.

An on-state small cell may transmit a control channel (for example, a PDCCH), a pilot (for example, a CRS or UE-specific RS), and data per subframe. It is preferable that an off-state small cell transmits no signal in view of interference management. However, when the state of a small cell is changed rapidly enough to quickly respond to a traffic load change, downlink traffic may be rather increased if no signal is transmitted. Thus, an off-state small cell transmits a minimal signal to quickly change to the on state. The minimal signal is newly introduced in Rel-12 and may be referred to as a DRS (discovery signal).

A DRS introduced in Rel-12 is configured using a combination of a Rel-8 primary synchronization signal (PSS), a Rel-8 secondary synchronization signal (SSS), and Rel-8 CRS port 0. If necessary, Rel-10 CSI-RS port 15 may be additionally configured. A UE may obtain coarse time synchronization and frequency synchronization with a small cell from the small cell through the PSS and the SSS. The UE may obtain accurate time synchronization and frequency synchronization using CRS port 0. If a DRS is configured using a CRS only, the UE may perform RRM measurement using the CRS only. If a CSI-RS is additionally used to configure a DRS, the UE may perform RRM measurement using only the CSI-RS based on synchronization obtained using a PSS/SSS/CRS.

A small cell may transmit a DRS regardless of the on state or off state. The DRS is transmitted to change the state of the small cell, and a quick state change of the small cell is greatly useful in view of interference management in a small cell cluster. When adjacent small cells transmit DRSs in sync, a UE receiving the DRSs may perform intra-frequency/inter-frequency RRM measurement with less battery consumption.

A DRS measurement timing configuration (DMTC) refers to time allowed for a UE to perform cell detection and radio resource measurement (RRM) based on a DRS, in which the UE may detect a plurality of DMTC-based cells with respect to one frequency. Thus, the UE may estimate the position of a DRS from a DMTC, and a DMTC may include a minimum period, an offset from a serving cell timing, and an available width, where the period may be set to at least 40 ms, 80 ms, or 160 ms in order that the UE performs a handover or RRM.

Hereinafter, a radio network temporary identifier (RNTI) is described.

A BS determines a PDCCH format according to DCI to be sent to a UE, attaches a cyclic redundancy check (CRC) to the DCI, and masks the CRC with a unique identifier according to the owner or purpose of a PDCCH. Here, the unique identifier is referred to as a radio network temporary identifier (RNTI). Table 1 illustrates RNTI types.

TABLE 1

| RNTI | Purpose | Transport Channel | Logical Channel |
|---|---|---|---|
| P-RNTI | Paging and System Information change notification | PCH | PCCH |
| SI-RNTI | Broadcast of System Information | DL-SCH | BCCH |
| M-RNTI | MCCH Information change notification | N/A | N/A |
| RA-RNTI | Random Access Response | DL-SCH | N/A |
| Temporary C-RNTI | Contention Resolution (when no valid C-RNTI is available) | DL-SCH | CCCH |
| Temporary C-RNTI | Msg3 transmission | UL-SCH | CCCH, DCCH, DTCH |
| C-RNTI | Dynamically scheduled unicast transmission | UL-SCH | DCCH, DTCH |
| C-RNTI | Dynamically scheduled unicast transmission | DL-SCH | CCCH, DCCH, DTCH |
| C-RNTI | Triggering of PDCCH ordered random access | N/A | N/A |
| Semi-Persistent Scheduling C-RNTI | Semi-Persistently scheduled unicast transmission (activation, reactivation and retransmission) | DL-SCH, UL-SCH | DCCH, DTCH |
| Semi-Persistent Scheduling C-RNTI | Semi-Persistently scheduled unicast transmission (deactivation) | N/A | N/A |

TABLE 1-continued

| RNTI | Purpose | Transport Channel | Logical Channel |
|---|---|---|---|
| TPC-PUCCH-RNTI | Physical layer Uplink power control | N/A | N/A |
| TPC-PUSCH-RNTI | Physical layer Uplink power control | N/A | N/A |

Table 2 illustrates the ranges of RNTI values.

TABLE 2

| Value (in hexadecimal) | RNTI |
|---|---|
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI (see note) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M-RNTI |
| FFFE | P-RNTI |
| FFFF | SI-RNTI |

Hereinafter, an LTE service in an unlicensed band is described.

A licensed band guarantees higher reliability and communication quality than those of an unlicensed band as a shared resource, since the exclusive right to use the licensed band is assigned to a single service provider. However, enormous costs are expended in securing a licensed band through spectrum auctions or the like, and securing an additional frequency is absolutely needed in order to deal with the current demand for data. As a solution, an LTE service in an unlicensed band (LTE on unlicensed spectrum (LTE-U)) has been proposed.

Figure 6:
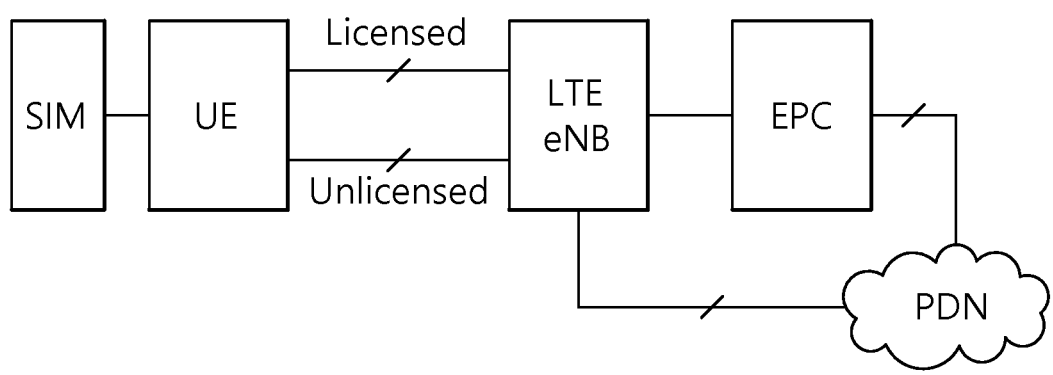
FIG. 6 illustrates a network configuration in which licensed and unlicensed bands are integrated.

LTE-U can provide improved mobility, security, and communication quality by extending advantages of LTE to an unlicensed band and can increase data throughput due to higher frequency efficiency of LTE than that of existing radio access technologies. Further, referring to FIG. 6, which illustrates a network in which licensed and unlicensed bands are integrated, LTE-U is fairly advantageous in terms of investment and management costs in that licensed and unlicensed bands can be managed as a single integrated network without significantly alterations to an existing core network.

However, since transmission output is generally restricted in an unlicensed band, an unlicensed band mostly provides smaller coverage than a licensed band that can be exclusively used, even though the unlicensed band is the same frequency band as the licensed band. Further, to comply with regulations set to minimize interference with other communication modes or communication devices of other service providers also present in the same frequency band, uniform levels of services may not be guaranteed in a certain area. Further, when service coverage is established based on an existing cellular mode using an unlicensed band, reliability in the transmission of an important signal, which needs to be transmitted through a control channel or the like, may not be sufficiently ensured. To avoid these problems and to maximally bring advantages of an unlicensed band, it is proposed to use an unlicensed band for CA in combination with an LTE service in a licensed band or as a supplement downlink (SDL).

Signal transmission, which needs to have guaranteed reliability to provide LTE services, such as network management, radio resource allocation, UE mobility control, and the like, is achieved through LTE in a licensed band serving as a primary component carrier (PCC). However, LTE in an unlicensed band may accommodate both a scenario for supporting both an uplink and a downlink and a scenario for supporting a downlink only, but always serves as a secondary component carrier (SCC) and operates in a manner for improving performance, such as cell capacity and average data rate per user, by supplementing an LTE service on a PCC. In a scenario where an LTE service in an unlicensed band is provided via integration with an LTE service in a licensed band, cross-carrier scheduling technology, security and QoS guaranteeing technology, or the like, which can be achieved in CA between licensed bands, may be applied and the performance of an LTE service in an unlicensed band, which is relatively vulnerable to interference, may be supplemented through inter-cell interference coordination (ICIC).

A key issue of LTE-U services is a fairness problem caused by coexistence with existing radio access technologies in an unlicensed band, especially WLAN technology. Since LTE and WLAN technologies are fundamentally different in PHY/MAC architecture, if these technologies coexist in a single band, a fairness problem may seriously arise in that services are concentrated only in LTE. That is, LTE can share a frequency using an OFDMA scheme, whereas a WLAN employs CSMA/CA and thus cannot share a channel but waits until the channel is idle. Thus, it is highly likely that communication is performed mainly via LTE. To solve this problem, a Listen Before Talk (LBT) mechanism for checking the presence of other communication radio waves that may cause interference in a corresponding band may be applied.

A cell on an unlicensed frequency is allowed to transmit a reference signal only during a channel occupation time. However, since a UE cannot know the channel occupation time, the UE cannot know when the reference signal is transmitted. Therefore, the UE does not know when to attempt to perform radio resource management (RRM) measurement, radio link monitoring (RLM) measurement or channel state information (CSI) measurement on the unlicensed frequency. Accordingly, in order to solve these problems, the present invention proposes a method for performing communication using a subframe occupied by an unlicensed frequency, and an apparatus supporting the same.

First, a method for performing communication using an unlicensed frequency based on a reference signal indication is described.

Step 0: A new RNTI may be set for a UE. The new RNTI may be an RNTI newly defined to receive a reference signal indication via a PDCCH.

Step 1: The UE monitors a PDCCH with the new RNTI and receives a reference signal indication via the PDCCH.

The reference signal indication may include information indicating whether a reference signal for RRM/RLM/CSI measurement on an unlicensed frequency is included. The reference signal indication may include information on the number of subframes for measurement. In the absence of the information on the number of subframes, the reference signal indication may be applied to a subframe to which the PDCCH belongs. The reference signal indication may include unlicensed frequency information for measurement. The reference signal indication may include identifier information on a cell on the unlicensed frequency for measurement.

The reference signal indication may be signaled per cell or per frequency. A plurality of reference signal indications may be signaled via a single PDCCH.

Step 3: The UE may determine whether the reference signal for RRM/RLM/CSI measurement on the unlicensed frequency is included in a corresponding subframe and may perform RRM/RLM/CSI measurement only on a subframe including the reference signal.

Figure 7:
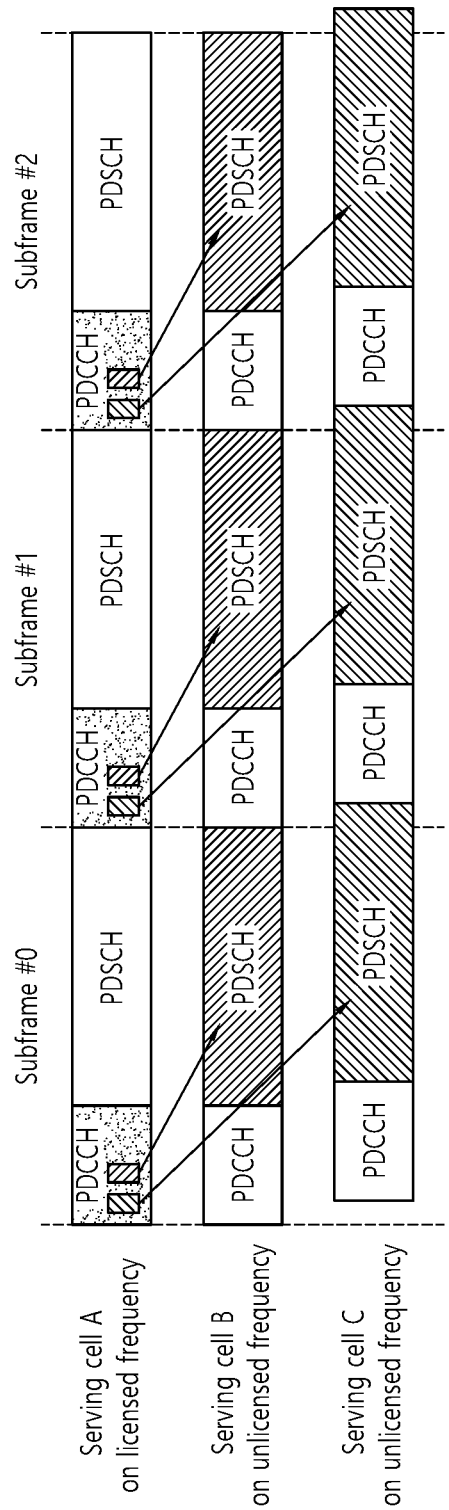
FIG. 7 illustrates an example of a method in which a reference signal indication with respect to an unlicensed frequency is transmitted from a serving cell on a licensed frequency according to an embodiment of the present invention.

FIG. 7 illustrates an example of a method in which a reference signal indication with respect to an unlicensed frequency is transmitted from a serving cell on a licensed frequency according to an embodiment of the present invention.

Referring to FIG. 7, suppose that a UE has two serving cells. Among the two serving cells, a PCell is cell A on a licensed frequency, and a SCell is cell B provided on an unlicensed frequency for the UE. Cell C is a neighboring cell. The UE may monitor a PDCCH of the PCell using a new RNTI in order to determine whether reference signals are transmitted from cell B and cell C. A reference signal indication may be signaled per cell.

In subframe #0, the reference signal indication in the PDCCH of the PCell may indicate that reference signals are transmitted from cell B and cell C. Then, the UE may perform measurement on cell B and cell C in subframe #0. In subframe #1, the reference signal indication in the PDCCH of the PCell may indicate that a reference signal is transmitted only from cell B. Then, the UE may perform measurement on cell B only but may not perform measurement on cell C in subframe #1. In subframe #2, the reference signal indication in the PDCCH of the PCell may indicate that no reference signal is transmitted from the unlicensed frequency. Then, the UE may perform no measurement on the unlicensed frequency in subframe #2.

Alternatively, the reference signal indication may indicate that a reference signal is transmitted with respect to a plurality of subframes. In this case, the reference signal indication may include information a measurement period. Then, the UE may perform measurement during the indicated measurement period.

Figure 8:
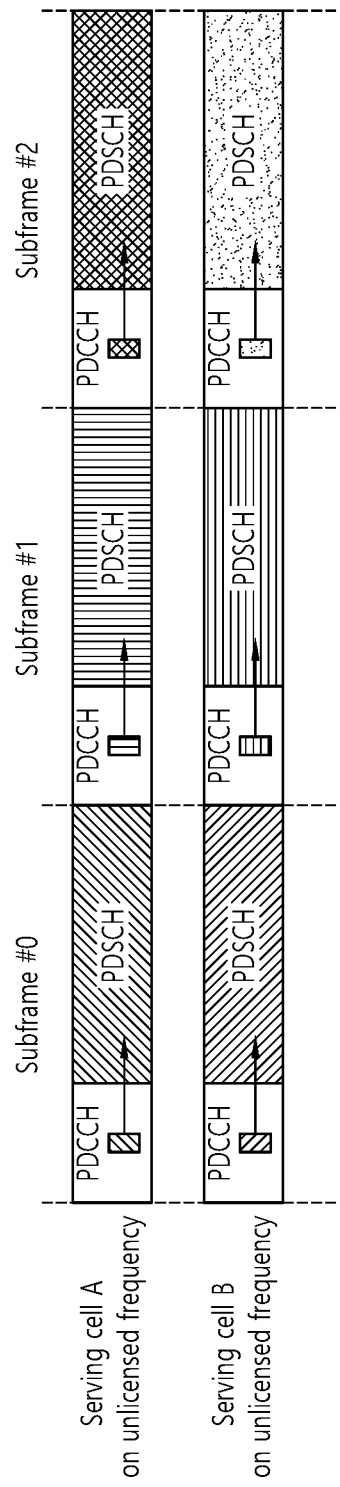
FIG. 8 illustrates an example of a method in which a reference signal indication with respect to an unlicensed frequency is transmitted from a serving cell on an unlicensed frequency according to an embodiment of the present invention.

FIG. 8 illustrates an example of a method in which a reference signal indication with respect to an unlicensed frequency is transmitted from a serving cell on an unlicensed frequency according to an embodiment of the present invention.

Referring to FIG. 8, suppose that there are two cells on an unlicensed band. A new RNTI may be set by a serving cell for a UE per cell on the unlicensed frequency. In the embodiment of FIG. 8, the UE may determine to perform measurement on cell A according to a reference signal indication in a PDCCH of cell A or may determine to perform measurement on cell B according to a reference signal indication in a PDCCH of cell B.

Next, a method for performing communication using an unlicensed frequency based on occupied subframe information is described.

A UE may receive information on a subframe occupied by an unlicensed frequency from a serving cell on a licensed frequency. The information on the subframe occupied by the unlicensed frequency may indicate which subframe is occupied. The information on the occupied subframe may indicate to the UE when to attempt to perform RRM/RLM/CSI measurement. The UE may consider that a reference signal for RRM/RLM/CSI measurement is not transmitted outside the occupied subframe. In the unlicensed frequency, the UE may perform RRM/RLM/CSI measurement only on a subframe including the reference signal.

Figure 9:
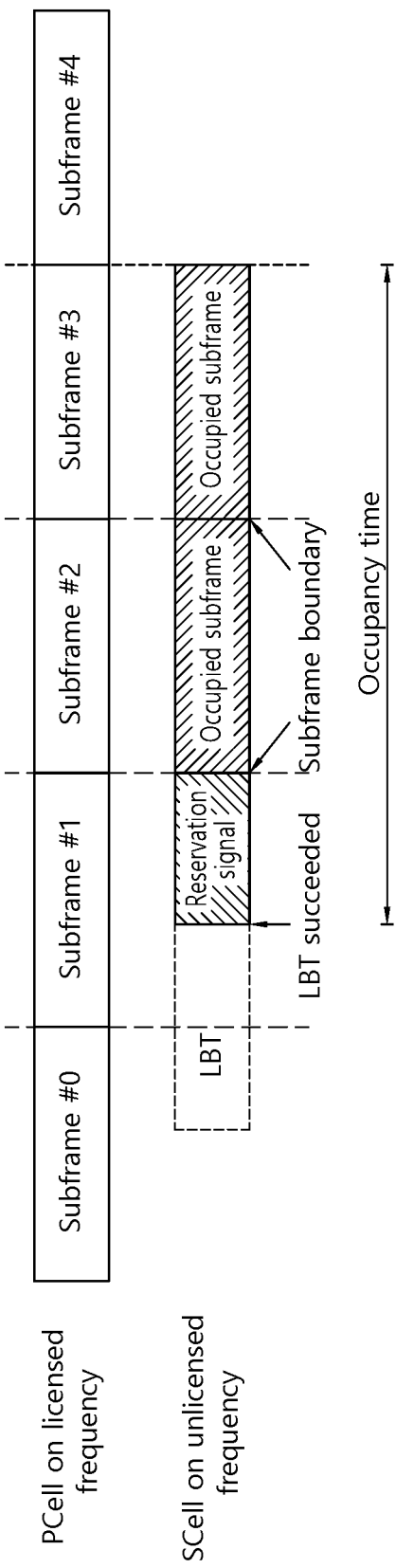
FIG. 9 illustrates an example of a method for indicating a subframe occupied by an unlicensed frequency according to an embodiment of the present invention.

FIG. 9 illustrates an example of a method for indicating a subframe occupied by an unlicensed frequency according to an embodiment of the present invention.

FIG. 9 illustrates a channel occupancy time of an unlicensed frequency with respect to an LTE cell. In the embodiment of FIG. 9, a UE may perform an LBT for checking the presence of other communication radio waves that may cause interference in a corresponding frequency with respect to a SCell on the unlicensed frequency. When the UE succeeds in the LBT in subframe #1, the UE may transmit a reservation signal with respect to the Scell on the unlicensed frequency, and subframes #2 and #3 may then fall under the occupancy time. Thus, a PCell on a licensed frequency may indicate to the UE that subframes #2 and #3 are occupied subframes. Subsequently, the UE may attempt to perform measurement only in subframes #2 and #3.

Figure 10:
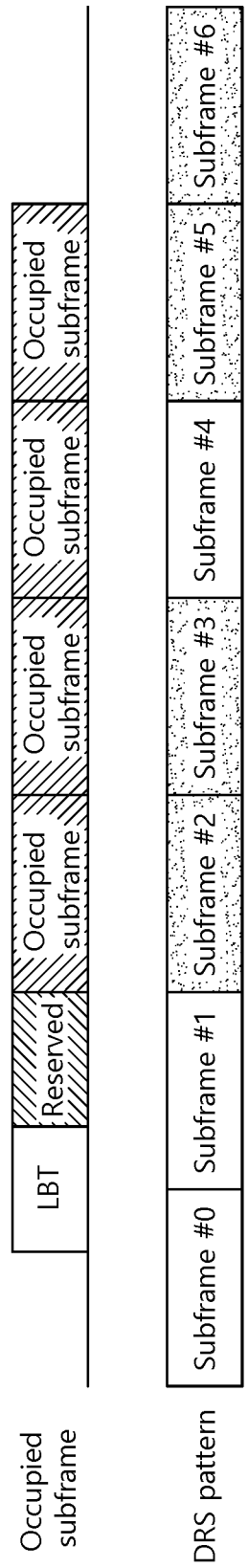
FIG. 10 illustrates another example of a method for indicating a subframe occupied by an unlicensed frequency according to an embodiment of the present invention.

FIG. 10 illustrates another example of a method for indicating a subframe occupied by an unlicensed frequency according to an embodiment of the present invention.

Referring to FIG. 10, in a cell on an unlicensed frequency which transmits a DRS, a UE may consider that the DRS is transmitted via an occupied subframe belonging to a DMTC occasion (that is, a DRS pattern). In the embodiment of FIG. 10, the UE may perform an LBT for checking the presence of other communication radio waves that may cause interference in a corresponding frequency with respect to a SCell on the unlicensed frequency. When the UE succeeds in the LBT in subframe #1, the UE may transmit a reservation signal with respect to the Scell on the unlicensed frequency. In the embodiment of FIG. 10, suppose that the UE is notified that subframes #2, #3, #4 and #5 are occupied and a DMTC occasion includes subframes #2, #3, #5 and #6. In this case, the UE may perform DRS-based measurement in subframes (that is, subframes #2, #3 and #5) overlapping with the DMTC occasion among the occupied subframes.

Figure 11:
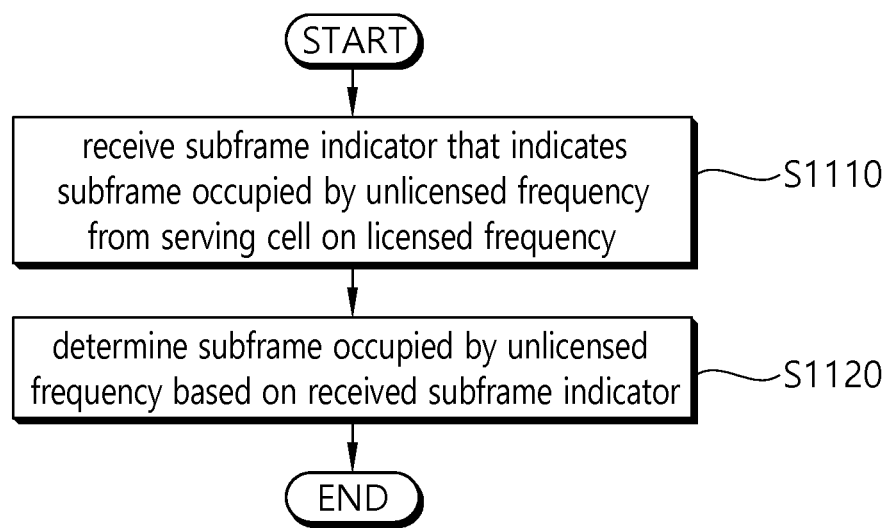
FIG. 11 is a block diagram illustrating a method for performing communication, by a UE, using a subframe occupied by an unlicensed frequency according to an embodiment of the present invention.

FIG. 11 is a block diagram illustrating a method for performing communication, by a UE, using a subframe occupied by an unlicensed frequency according to an embodiment of the present invention.

The UE may receive a subframe indicator that indicates a subframe occupied by an unlicensed frequency from a serving cell on a licensed frequency (S1110).

The UE may determine a subframe occupied by the unlicensed frequency based on the received subframe indicator (S1120).

The method may further include receiving a reference signal via the determined subframe occupied by the unlicensed frequency and may further include performing cell measurement based on the received reference signal. The cell measurement may be one of radio resource management (RRM) measurement, radio link monitoring (RLM) measurement, and channel state information (CSI) measurement.

In DRS reception, the method may further include receiving a discovery reference signal (DRS) via a subframe overlapping with a DRS measurement timing configuration (DMTC) occasion among the determined subframes occupied by the unlicensed frequency.

Figure 12:
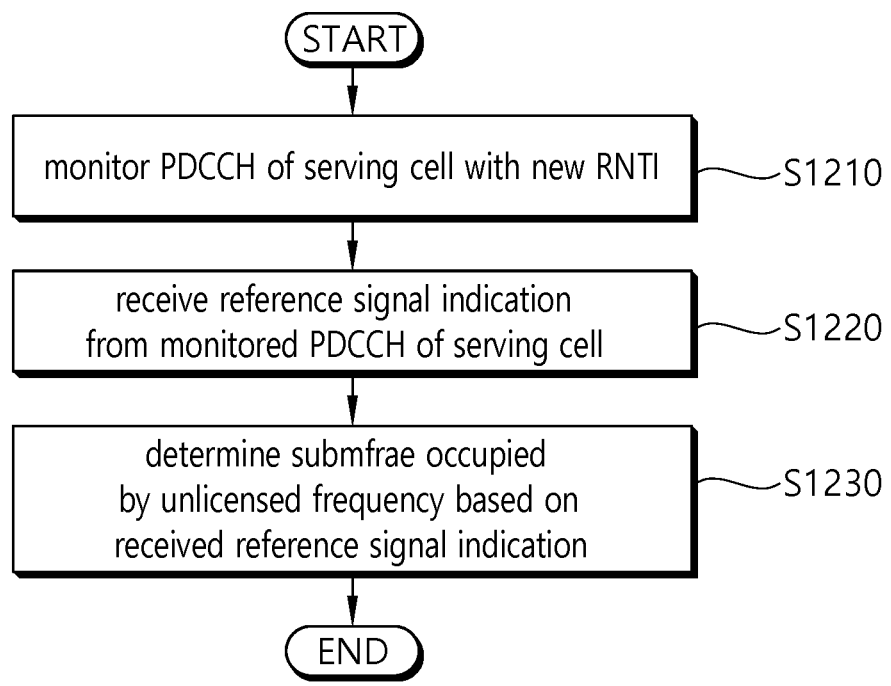
FIG. 12 is a block diagram illustrating a method for performing communication, by a UE, using a subframe occupied by an unlicensed frequency according to another embodiment of the present invention.

FIG. 12 is a block diagram illustrating a method for performing communication, by a UE, using a subframe occupied by an unlicensed frequency according to another embodiment of the present invention.

The UE may monitor a PDCCH of a serving cell using a new radio RNTI (S1210). The new RNTI may be an RNTI newly set for the UE to receive the reference signal indication from the PDCCH. The PDCCH of the serving cell may be a PDCCH of a serving cell on a licensed frequency. Alternatively, the PDCCH of the serving cell may be a PDCCH of a serving cell on the unlicensed frequency.

The UE may receive a reference signal indication from the monitored PDCCH of the serving cell (S1220). The reference signal indication may include information indicating whether a reference signal for RRM, RLM, or CSI measurement in the unlicensed frequency is included. The reference signal indication may include information on the number of subframes occupied by the unlicensed frequency. The reference signal indication may include information on a subframe occupied by the unlicensed frequency. The reference signal indication may include identifier information on a cell on the unlicensed frequency. The reference signal indication may be signaled per cell or per frequency. A plurality of reference signal indications may be signaled via a single PDCCH.

The UE may determine a subframe occupied by the unlicensed frequency based on the received reference signal indication (S1230).

The method may further include receiving a reference signal on the determined subframe occupied by the unlicensed frequency and may further include performing cell measurement based on the received reference signal. The cell measurement may be one of radio resource management (RRM) measurement, radio link monitoring (RLM) measurement, and channel state information (CSI) measurement.

Figure 13:
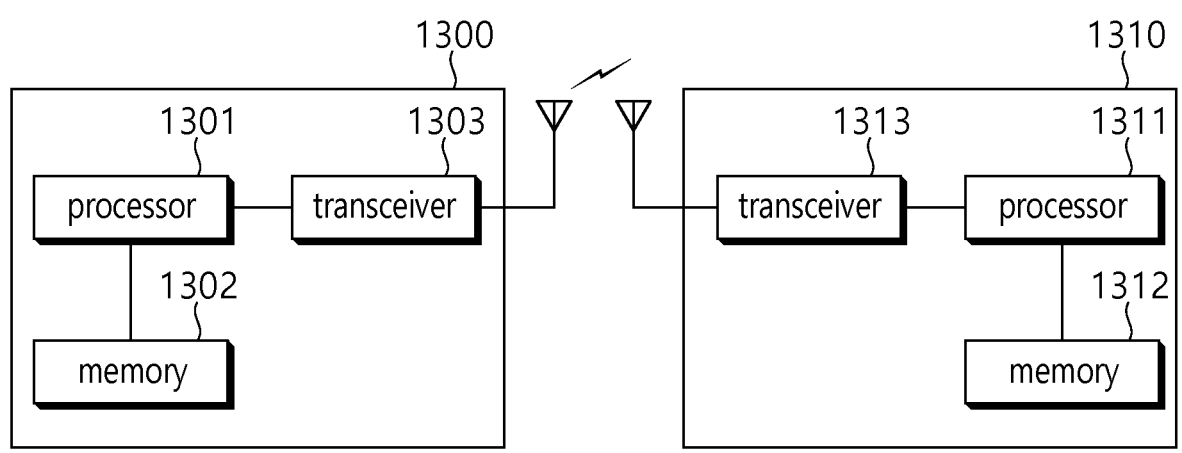
FIG. 13 is a block diagram illustrating a wireless communication system according to the embodiment of the present invention.

FIG. 13 is a block diagram illustrating a wireless communication system according to the embodiment of the present invention.

A BS 1300 includes a processor 1301, a memory 1302 and a transceiver 1303. The memory 1302 is connected to the processor 1301, and stores various information for driving the processor 1301. The transceiver 1303 is connected to the processor 1301, and transmits and/or receives radio signals. The processor 1301 implements proposed functions, processes and/or methods. In the above embodiment, an operation of the base station may be implemented by the processor 1301.

A UE 1310 includes a processor 1311, a memory 1312 and a transceiver 1313. The memory 1312 is connected to the processor 1311, and stores various information for driving the processor 1311. The transceiver 1313 is connected to the processor 1311, and transmits and/or receives radio signals. The processor 1311 implements proposed functions, processes and/or methods. In the above embodiment, an operation of the UE may be implemented by the processor 1311.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for performing communication, by a user equipment (UE), using an unlicensed frequency in a wireless communication system, the method comprising:
receiving subframe information related to a subframe occupied by the unlicensed frequency from a serving cell,
wherein the serving cell uses a licensed frequency;
determining one or more subframes occupied by the unlicensed frequency based on the received subframe information;
determining a subframe overlapping with a discovery reference signal (DRS) measurement timing configuration (DMTC) occasion among the one or more subframes based on the DMTC occasion and the one or more subframes;

receiving a DRS based on the subframe overlapping with the DMTC occasion among the one or more subframes occupied by the unlicensed frequency; and performing DRS based measurement based on the received DRS.

2. The method of claim 1, further comprising receiving a reference signal based on the determined one or more subframes occupied by the unlicensed frequency.

3. The method of claim 2, further comprising performing cell measurement based on the received reference signal.

4. The method of claim 3, wherein the cell measurement is one of radio resource management (RRM) measurement, radio link monitoring (RLM) measurement, and channel state information (CSI) measurement.

5. A method for performing communication, by a user equipment (UE), using an unlicensed frequency in a wireless communication system, the method comprising:

monitoring a physical downlink control channel (PDCCH) from a first serving cell based on a new radio network temporary identifier (RNTI), wherein the UE is connected with the first serving cell, in which the first serving cell uses a licensed frequency, and a second serving cell, in which the second serving cell uses an unlicensed frequency;

receiving reference signal information based on the monitored PDCCH from the serving cell, wherein the reference signal information includes first information related to a subframe occupied by the unlicensed frequency and second information related to a plurality of cells transmitting a reference signal on the subframe occupied by the unlicensed frequency, wherein the second information informs that the plurality of cells include the second serving cell and at least one of neighbor cells, and wherein the at least one of neighbor cells use the unlicensed frequency;

determining one or more subframes occupied by the unlicensed frequency based on the received reference signal information;

receiving a first reference signal, which is transmitted from the second serving cell, and a second reference signal, which is transmitted from the at least one of neighbor cells on the one or more subframes occupied by the unlicensed frequency; and performing first cell measurement and second cell measurement, respectively based on the first reference signal and the second reference signal, wherein the new RNTI is an RNTI newly set for the UE to receive the reference signal information from the PDCCH.

6. The method of claim 5, wherein the reference signal information includes third information informing whether a reference signal for radio resource management (RRM), radio link monitoring (RLM), or channel state information (CSI) measurement in the unlicensed frequency is comprised.

7. The method of claim 5, wherein the reference signal information includes at least one of fourth information related to a number of subframes occupied by the unlicensed frequency, fifth information related to a subframe occupied by the unlicensed frequency, and identifier information related to a cell on the unlicensed frequency.

8. The method of claim 5, wherein a plurality of reference signal information is received via a single PDCCH.

9. The method of claim 5, wherein the first or the second cell measurement is one of radio resource management (RRM) measurement, radio link monitoring (RLM) measurement, and channel state information (CSI) measurement.

10. A user equipment (UE) performing communication using an unlicensed frequency in a wireless communication system, the apparatus comprising:

a memory;

a transceiver; and a processor to operatively coupled to the memory and the transceiver, wherein the processor is configured to:

control the transceiver to receive subframe information related to a subframe occupied by the unlicensed frequency from a serving cell, wherein the serving cell uses a licensed frequency;

determine one or more subframes occupied by the unlicensed frequency based on the received subframe information;

determine a subframe overlapping with a discovery reference signal (DRS) measurement timing configuration (DMTC) occasion among the one or more subframes based on the DMTC occasion and the one or more subframes;

control the transceiver to receive a DRS based on the subframe overlapping with the DMTC occasion among the one or more subframes occupied by the unlicensed frequency; and perform DRS based measurement based on the received DRS.

* * * * *